United States Patent [19]

Safinya et al.

[11] Patent Number: 4,994,671

[45] Date of Patent: Feb. 19, 1991

[54] APPARATUS AND METHOD FOR ANALYZING THE COMPOSITION OF FORMATION FLUIDS

[75] Inventors: Kambiz A. Safinya, Ridgefield; Jeffrey A. Tarvin, Brookfield Center, both of Conn.

[73] Assignee: Schlumberger Technology Corporation, New York, N.Y.

[21] Appl. No.: 418,748

[22] Filed: Oct. 4, 1989

Related U.S. Application Data

[63] Continuation of Ser. No. 137,500, Dec. 23, 1987, abandoned.

[51] Int. Cl.$^5$ .................. G01V 9/00; G01N 21/17
[52] U.S. Cl. .................. 250/255; 250/253; 250/343; 250/256; 250/339
[58] Field of Search .............. 250/253, 255, 339, 343, 250/344, 422, 256

[56] References Cited

U.S. PATENT DOCUMENTS

| | | | |
|---|---|---|---|
| 2,334,475 | 11/1943 | Claudet | 250/71 |
| 2,423,774 | 7/1947 | Heigl | 250/83 |
| 2,425,531 | 8/1947 | Haseltine et al. | 88/14 |
| 3,371,574 | 3/1968 | Dwyer | 88/14 |
| 3,859,851 | 1/1975 | Urbanosky | 73/155 |
| 3,896,312 | 7/1975 | Brown et al. | 364/497 |
| 4,227,083 | 10/1980 | Sherinski | 250/343 |
| 4,371,785 | 2/1983 | Pedersen | 250/343 |
| 4,396,259 | 8/1983 | Miller | 351/44 |
| 4,427,944 | 1/1984 | Chandler | 324/353 |
| 4,492,862 | 1/1985 | Grynberg et al. | 250/343 |
| 4,540,283 | 9/1985 | Bachalo | 356/336 |
| 4,602,160 | 7/1986 | Mactaggart | 250/341 |
| 4,608,859 | 9/1986 | Rockley | 73/153 |
| 4,609,821 | 9/1986 | Summers | 250/255 |
| 4,620,284 | 10/1986 | Schnell et al. | 364/498 |
| 4,663,961 | 5/1987 | Nelson et al. | 73/24 |

FOREIGN PATENT DOCUMENTS

0215648  3/1987  European Pat. Off. .......... 250/339

OTHER PUBLICATIONS

"Flow Vision On-Line Infrared Analyzers", Technical Brochure from the Kapusta-Guterman Corp.
"Flow Vision Continuous On-Line Analyzer", Technical Brochure from the Kapusta-Guterman Corp.

(List continued on next page.)

*Primary Examiner*—Constantine Hannaher
*Assistant Examiner*—Edward J. Glick
*Attorney, Agent, or Firm*—David P. Gordon; Peter Y. Lee

[57] ABSTRACT

A borehole apparatus for analyzing the composition of a formation fluid is disclosed and generally comprises a testing chamber, a means for directing a sample of fluid into the chamber, a light source which emits at least near infrared rays, a spectral detector, a data base means, and a processing means. The light source is preferably an incandescent lamp and the testing chamber includes a window which is substantially optically transparent to at least one near infrared light, and preferably also the near ultraviolet and visible light of the source. The light source is directed at least partly towards the window in the chamber either via collimation or fiber optics. The spectral detector means is preferably a spectrometer which detects and measures the spectra of the light which has been transmitted through and the light which is backscattered by the fluid sample. The preferred data base means stores the spectra at different pressures and temperatures of water, gas, and a plurality of oils. A determination of the composition of the fluid sample is made by the processing means by obtaining the spectrum of the source, and at least one of the transmitted light or backscattered light spectra, and by fitting the plurality of spectra in the data base to the obtained spectral information. A determination of a transition of the obtained fluid samples from mud filtrate to formation fluids is made by monitoring the visible light and/or near ultraviolet spectrum for changes in large molecule components.

34 Claims, 4 Drawing Sheets

OTHER PUBLICATIONS

"Flow Vision, The Dawn of a New Age in On-Line Quality Control", Technical Brochure from the Kapusla-Guterman Corp.

"Flow Vision Analyzer On-Line and Research Particle Analysis", Technical Brochure from the Kapusta-Guterman Corp.

Neuman, Hans-Joachim, *Composition of Properties of Petroleum*, Halsted Press, (New York), 1981.

Bevington, Philip, *Data Reduction and Error Analysis for the Physical Sciences*, McGraw-Hill Book Company (New York), 1969.

Kinghorn, Robert, *An Introduction to the Physics and Chemistry of Petroleum*, John Wiley & Sons (New York), 1983.

Speight, James G. *The Chemistry and Technology of Petroleum*, Marcel Dekker, Inc. (New York), 1980.

Tissot, B. P. et al., *Petroleum Formation and Occurrence*, Second Edition, Springer-Verlag (New York), 1984.

"The Flow Vision Analyzer", Technical Brochure from the Kapusta-Guterman Corp.

"Plastics Compounding", Technical Brochure from the Kapusta-Guterman Corp. Jul./Aug. 1987, vol. 10, No. 5.

"On-Line Particulate Analysis of Polymers and Compounds: In-the-Melt vs. Finished Products Studies", Kilham, Lawrence, from the 1986 Polymers, Lamination and Coatings Conference.

"Structure of Water and Aqueous Solutions", by Werner A. Luck→from International Symposium at Marburg, Jul. 1973, pp. 247-283.

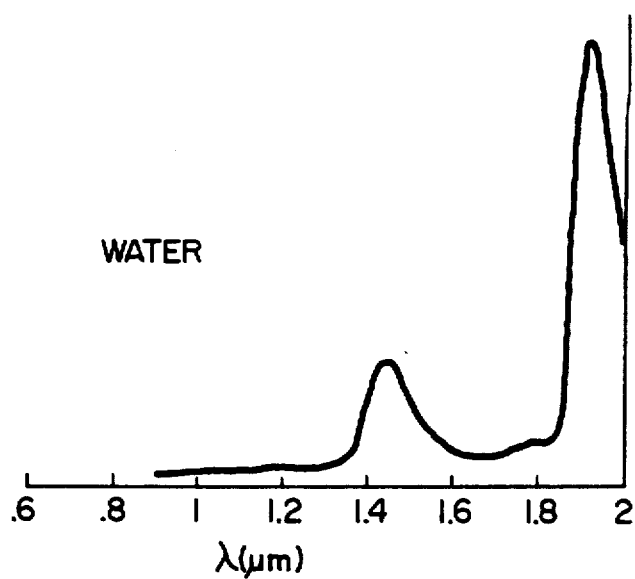
FIG. 5a  WATER
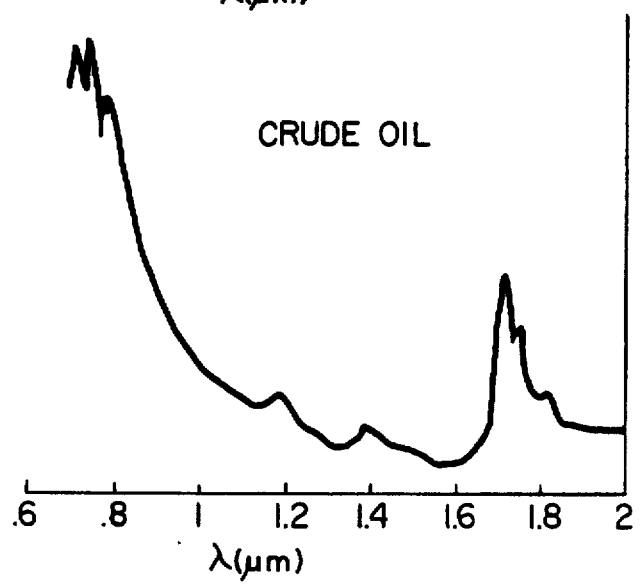
FIG. 5b  CRUDE OIL
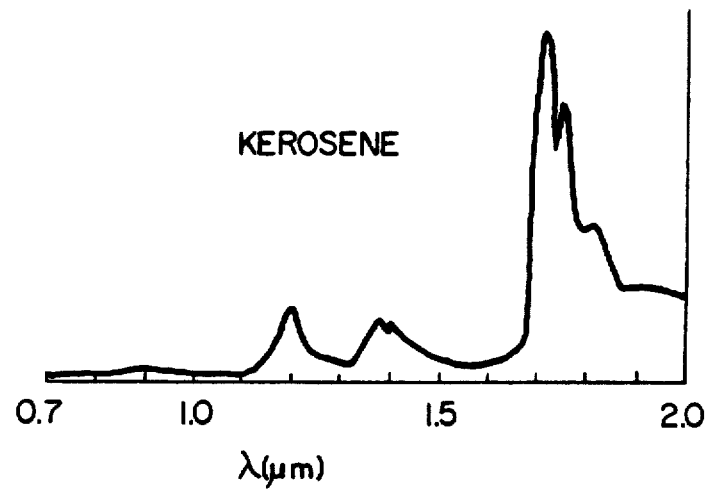
FIG. 5c  KEROSENE

APPARATUS AND METHOD FOR ANALYZING THE COMPOSITION OF FORMATION FLUIDS

This is a continuation of co-pending application Ser. No. 07/137,500 filed on Dec. 23, 1987, now abandoned.

BACKGROUND OF THE INVENTION

This invention relates to apparatus and methods for analyzing the composition of formation fluids, and more particularly to apparatus and methods for using near infrared spectral analysis to determine the quantities of gas, water and various types of oils in a formation fluid.

As seen in FIG. 1, several different interactions may occur when light strikes a sample. Typically, if the sample is fluid, some light is reflected at the boundary of the sample while the rest of the light enters the sample. Inside the sample, light is scattered by molecular excitations (Raman scattering) and by collective modes of the medium (e.g. Rayleigh scattering). In general, only a very small fraction of the light is scattered per centimeter of the path by the Raman and Rayeigh scattering processes.

If more than one phase is present in the sample, light is elastically scattered by reflection and refraction at the boundaries between the phases. This scattering process can be quite strong as light may be scattered man times in less than one centimeter of the path. Light which is not scattered or which is scattered but emerges from the sample travelling in a direction nearly parallel to and in the same direction as the incident light is generally referred to as "transmitted". Light which emerges travelling in other directions is referred to as "scattered", while light which emerges travelling in a direction nearly opposite to the incident light is referred to as "backscattered".

Regardless of scattering, some light is absorbed by the sample. The fraction of incident light absorbed per unit of pathlength in the sample depends on the composition of the sample and on the wavelength of the light. Thus, the amount of absorption as a function of wavelength, hereinafter referred to as the "absorption spectrum", is an indicator of the composition of the sample. In the wavelength range of 0.3 to 2.5 microns, which is the range of primary interest according to this invention, there are two important absorption mechanisms in borehole fluids. In the near infrared region (1 to 2.5 microns), absorption results primarily from the excitation of overtones of molecular vibrations involving hydrogen ions in the borehole fluids. In the near ultraviolet, visible, and very near infrared regions (covering wavelengths of 0.3 to 1 micron), absorption results primarily from excitation of electronic transitions in large molecules in the borehole fluids such as asphaltenes, resins, and porphyrins.

In the past, techniques have been known for the qualitative and quantitative analysis of gas, liquid, and solid samples. Methods and apparatus for accomplishing the same are disclosed in U.S. Pat. No. 4,620,284 to R. P. Schnell where a helium-neon laser is used to provide photons of a 0.633 micron wave length which are directed at a sample. The resulting Raman spectrum which comprises scattered light at different wavelengths than the incident light is then measured, and the measured spectrum is compared with previously obtained reference spectra of a plurality of substances. The provided technique is applied to monitoring fluid flowing through a pipeline in an oil refinery.

In U.S. Pat. No. 4,609,821 to C. F. Summers, especially prepared rock cuttings containing at least oil from an oil-based mud are excited with UV radiation with a 0.26 micron wave length Instead of measuring the Raman spectrum as is done in the aforementioned Schnell patent, in accord with the Summers disclosure, the frequency and intensity of the resulting excited waves (fluorescence) which are at a longer wavelength than the incident radiation are detected and measured. By comparing the fluorescent spectral profile of the detected waves with similar profiles of the oil used in the oil-based mud, a determination is made as to whether formation oil is also found in the rock cuttings.

While the Summers and Schnell disclosures may be useful in certain limited areas, it will be appreciated that they suffer from various drawbacks. For example, the use of laser equipment in Schnell severely restricts the environment in which the apparatus may be used, as lasers are not typically suited to harsh temperature and/or pressure situations (e.g. a borehole environment). Also, the use of the Raman spectrum in Schnell imposes the requirement of equipment which can detect with very high resolution the low intensity scattered signals. The use by Summers of light having a 0.26 micron wavelength severely limits the investigation of the sample to a sample of nominal thickness. In fact, the Summers patent requires that the sample be diluted with solvents before investigation. Thus, the Summers patent, while enabling a determination of whether the mud contains formation oil, does not permit an analysis of formation fluids in situ. Finally, the Summers method has no sensitivity to water.

Those skilled in the art will appreciate that the ability to conduct an analysis of formation fluids downhole is extremely desirable. A first advantage would be the ability to distinguish between formation fluids and mud filtrate, thereby permitting a fluid extraction tool to retain only fluids of interest for return to the formation surface. A second advantage is in the production phase, where a determination of the fluid type (i.e. water, oil, or gas) entering the well from the formations can be made immediately downhole.

SUMMARY OF THE INVENTION

It is therefore an object of the invention to provide a method and apparatus for analyzing the composition of a formation fluid which may include water, gas, one or more of a plurality of oils, and solid particles.

It is a further object of the invention to provide a downhole apparatus for analyzing in situ the composition of a formation fluid.

It is another object of the invention to provide an apparatus using at least the near infrared spectrum for analyzing the composition of formation fluid.

In accord to the objects of the invention, a borehole apparatus for analyzing the composition of a formation fluid generally comprises a testing region, a means for directing a sample of fluid into the region, a light source emitting at least near infrared rays, a spectral detector, a data base means, and a processing means. The testing region is basically either a tube through which the formation fluids can flow, a chamber in which the fluid may be kept for transfer to the formation surface, or a path which interrupts a path of light travelling through a light transmitting means. If a tube or chamber is used, the tube or chamber should include a window which is optically transparent to at least near infrared light, and preferably also to near ultraviolet and visible light. The light source may be an incandescent lamp with a known or determinable spectrum, and the emitted light is directed at least partly towards the window in the tube or chamber either via collimation or fiber optics. The spectral detector means is preferably a spectrometer which detects and measures the spectrum of the light which has been transmitted through or scattered from the fluid sample. Typically, the spectral detector means also includes directing and focussing mirrors or additional fiber optic bundles.

Knowing the spectrum of the emitted light and the spectrum of the detected light which has been affected by the fluid sample, a determination of the composition of the fluid sample may be had if a data base of the spectra of the possible components of the fluid is available. Towards that end, the spectra of water, gas, and a plurality of different oils are found and stored in a data base. Then, using a fitting technique such as a least squares analysis or a principle component analysis, a processing means (e.g. a computer or microprocessor) with access to all the information can conduct the desired fluid component analysis. Preferably, in further accordance with the principles of the invention, spectra of the oils, gas, and water at different pressures and temperatures can be maintained and used in the fitting process. Also, with regard to another aspect of the invention, a determination of a transition of the obtained fluid samples from mud filtrate to formation fluids is made by monitoring the visible light and/or near ultraviolet spectrum for changes in the same.

A better understanding of the invention, and additional advantages and objects of the invention will become apparent to those skilled in the art upon reference to the detailed description and the accompanying drawings.

BRIEF DESCRIPTION OF THE DRAWINGS

FIGS. 5a-5c show logarithmic plots of the near infrared absorption spectra of water, crude oil, and kerosene;

DETAILED DESCRIPTION OF THE PREFERRED EMBODIMENT

Figure 1:
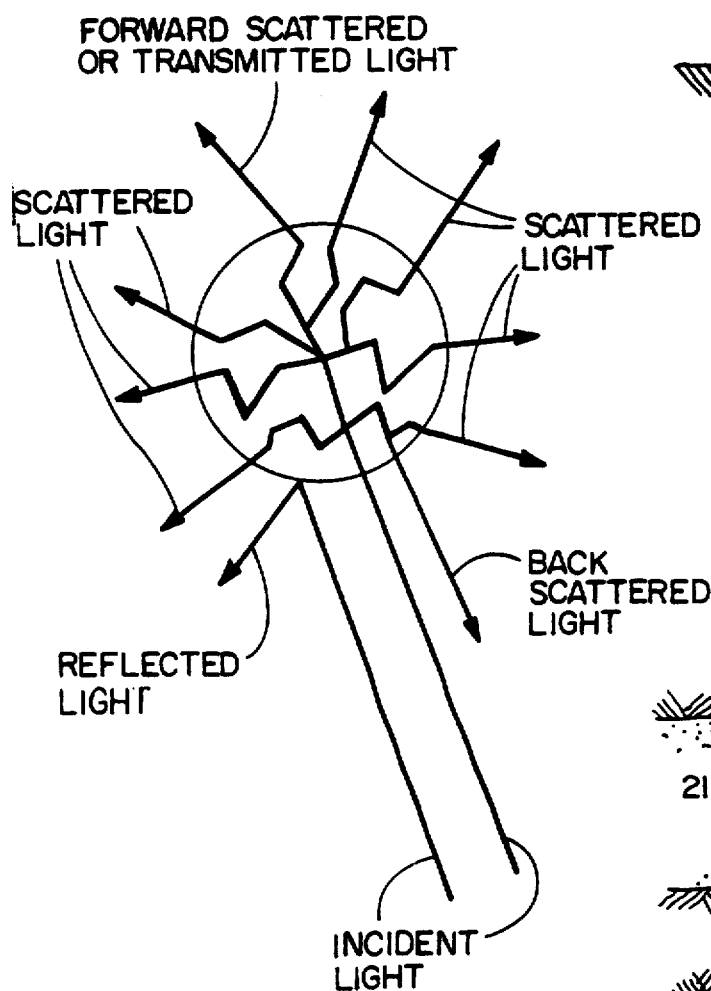
FIG. 1 is a diagram of some of the different interactions which may occur when light strikes a sample.
Figure 2:
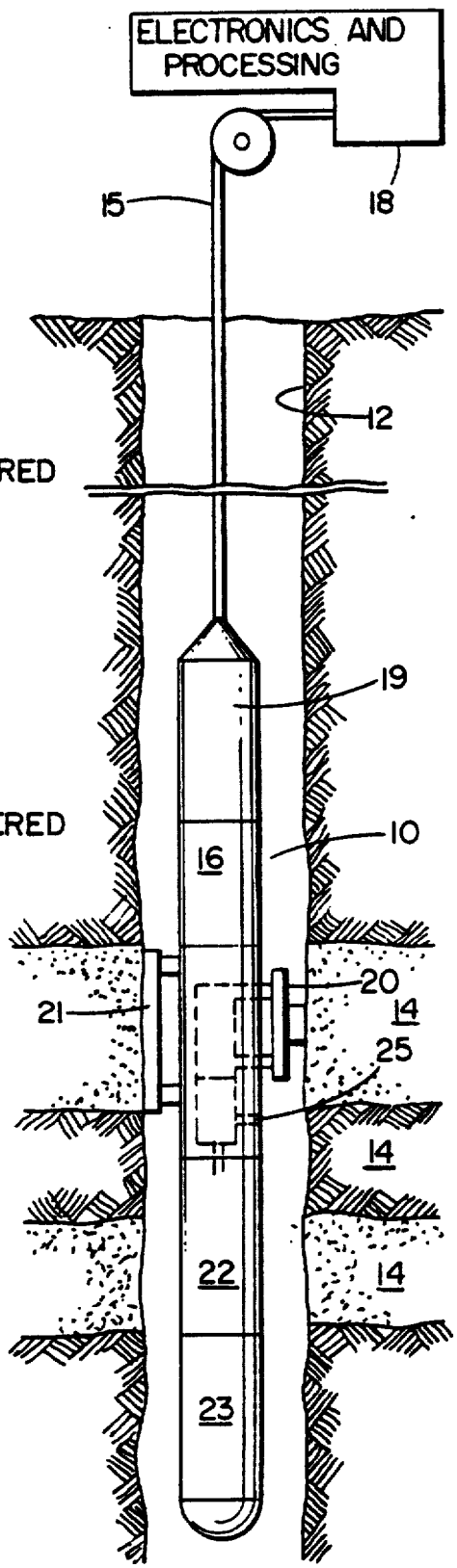
FIG. 2 is a schematic diagram of a first embodiment of a borehole apparatus for analyzing the composition of a formation fluid.

The instant invention is particularly applicable to both production logging and to borehole investigative logging. For purposes of brevity, however, the description herein will be primarily directed to borehole investigative logging. Thus, a borehole logging tool 10 for testing earth formations and analyzing the composition of fluids from the formation 14 in accord with invention is seen in FIG. 2. As illustrated, the tool 10 is suspended in the borehole 12 from the lower end of a typical multiconductor cable 15 that is spooled in the usual fashion on a suitable winch (not shown) on the formation surface. On the surface, the cable 15 is electrically connected to an electrical control system 18. The tool 10 includes an elongated body 19 which encloses the downhole portion of the tool control system 16. The elongated body 19 also carries a selectively extendible fluid admitting assembly 20 and a selectively extendible tool anchoring member 21 which are respectively arranged on opposite sides of the body. The fluid admitting assembly 20 is equipped for selectively sealing off or isolating selected portions of the wall of borehole 12 such that pressure or fluid communication with the adjacent earth formation is established. Also included with tool 10 are a fluid analysis module 25 through which the obtained fluid flows. The fluid may thereafter be expelled through a port (not shown) or it may be sent to one or more fluid collecting chambers 22 and 23 which may receive and retain the fluids obtained from the formation. Control of the fluid admitting assembly, the fluid analysis section, and the flow path to the collecting chambers is maintained by the electrical control systems 16 and 18. Additional details of methods and apparatus for obtaining formation fluid samples may be had by reference to U.S. Pat. No. 3,859,851 to Urbanosky and U.S. Pat. No. 4,396,259 to Miller and Ser. No. 313,236, no abandoned assigned to the assignee herein. It should be appreciated, however, that it is not intended that the invention be limited to any particular method or apparatus for obtaining the formation fluids.

Figure 3:
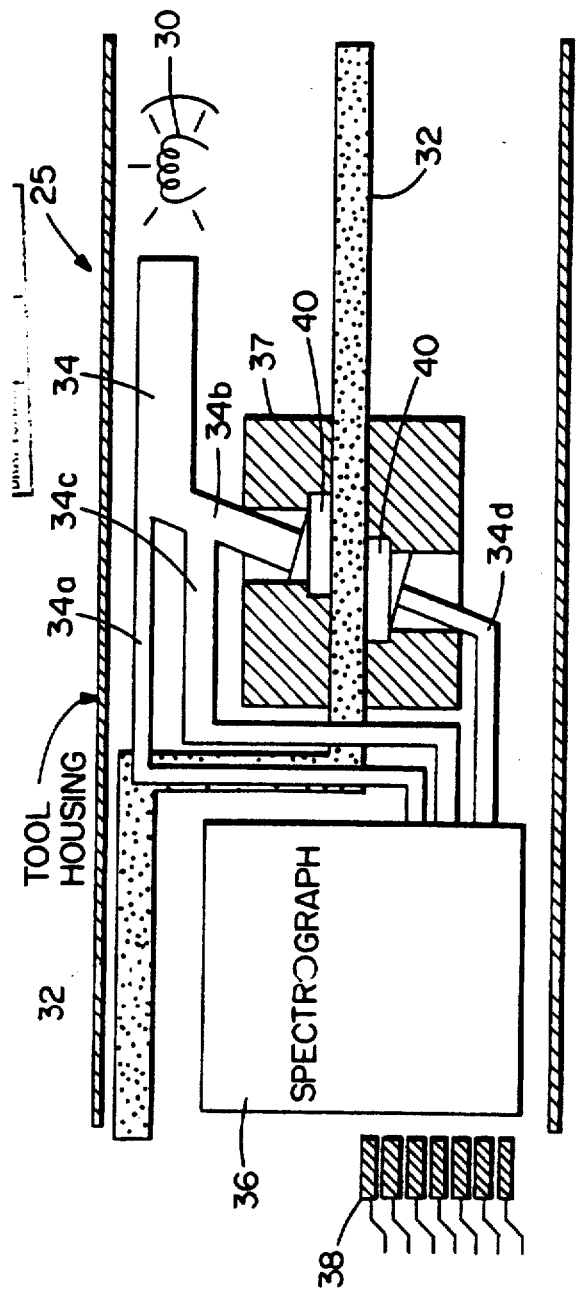
FIG. 3 is a schematic diagram of the preferred near infrared fluid analysis module of FIG. 2.
Figure 4:
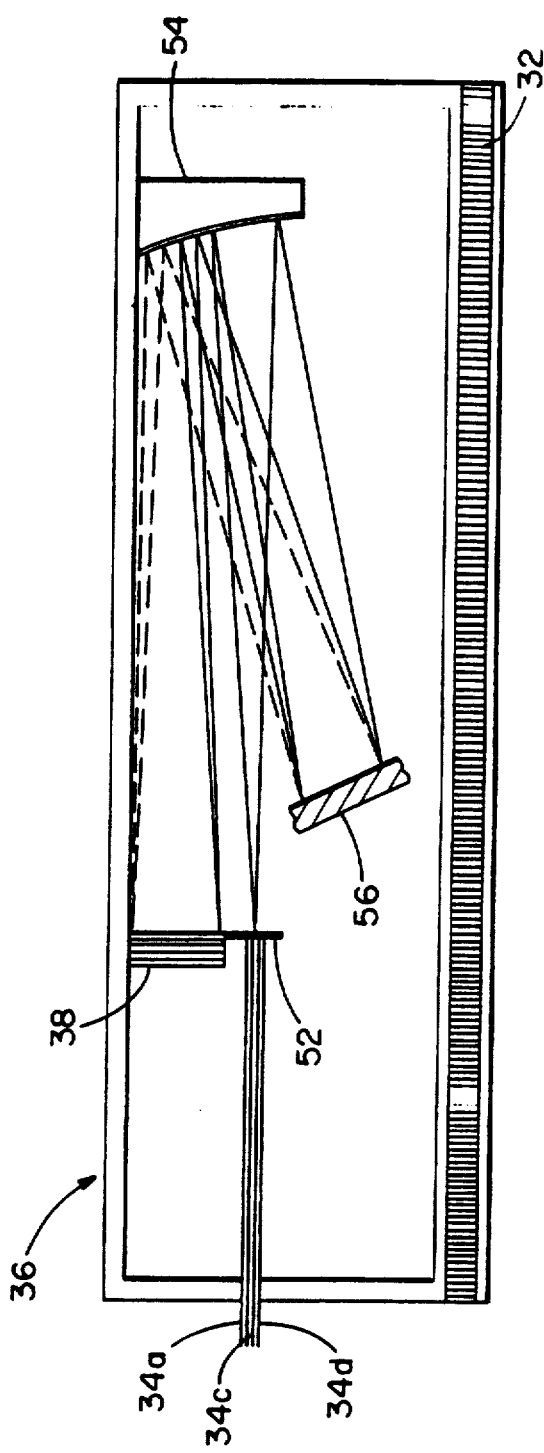
FIG. 4 is a schematic diagram of the preferred spectrometer of the invention.

Turning to FIG. 3, the preferred fluid analysis module 25 is seen in detail and preferably includes a light source 30, a fluid sample tube 32, optical fibers 34, and a spectrograph 36 and associated detector array 38. The light source 30 is preferably an incandescent tungsten-halogen lamp which is kept at near atmospheric pressure. The light source 30 is relatively bright throughout the near infrared wavelength region of 1 to 2.5 microns and down to approximately 0.5 microns, and has acceptable emissions from 0.35 to 0.5 microns. Light rays from the light source 30 are preferably transported from the source to the fluid sample by at least part of a fiber optic bundle 34. The fiber optic bundle 34 us preferably split into various sections. A first small section 34a goes directly from the light source 30 to the spectrograph 36 and is used to sample the light source. A second section 34b is directed into an optical cell 37 through which the sample tube 32 runs and is used for illuminating the fluid sample. A third section 34c originates at the cell 37 and goes directly to the spectrograph 36 and is used to collect light substantially backscattered by the sample. Spectral information obtained by section 34c is helpful in determining the composition of the sample fluid, and in conjunction with a fourth bundle 34d, in determining whether gas is present as will be discussed hereinafter. A fourth bundle 34d collects light transmitted or scattered through the sample and also provides information regarding the nature of the fluid flowing through the sample tube or chamber 32. A three position solenoid (not shown) is used to place one of bundles 34a, 34c and 34d at the input slit (seen in FIG. 4) of the spectrograph, and a light chopper (not shown) modulates the signal at 500 Hz to avoid low frequency noise in the detectors.

As aforementioned, optical bundle 34b directs the light towards the fluid sample. The fluid sample is obtained from the formation by the fluid admitting assembly and then is sent to the fluid analysis section 25 in tube 32. In a preferred embodiment, the sample tube 32 is a three by four millimeter rectangular channel. The tube preferably includes a section 40 with windows made of sapphire This section 40 is located in the optical cell 37 where the light rays are arranged to illuminate the sample. Sapphire is chosen as it is substantially transparent to the spectrum of the preferred light source. Also, sapphire is preferable because it is much harder than silica and resists abrasion. As indicated in FIG. 3, the sapphire window areas 40 of tube 32 may be arranged to be thick so as to withstand high internal pressure, and the window areas are offset slightly so that they are kept centered on the path of the transmitted light. The fiber optic bundle 34b is not perpendicular to the flow stream so as to ensure that specular reflection does not enter fiber optic bundle 34c, because specular reflection (reflection due to the interface of the sapphire wall and the liquid sample) does not provide useful information. As a result of the arrangement, optic bundle 34c will receive and conduct substantially backscattered light.

As previously indicated, the fiber optic bundles 34a, 32c and 34d terminate at the spectrograph 36. As seen in-detail in FIG. 4, the spectrograph includes an entrance slit 52, an off-axis paraboloidal mirror 54, a diffraction grating means 56, and the detector array 38. Light exiting the chosen fiber- optic bundle and entering the spectrograph 36 via slit 52 reflects off the off-axis paraboloidal mirror 54 towards a blazed diffraction grating 56. The blazed diffraction grating disperses and diffracts the light into a small range of angles, with rays of different wavelengths being diffracted differently. The diffracted and dispersed light is directed back toward a section of the off-axis paraboloidal mirror which causes the rays of different wavelengths to be reflected and focussed on different elements of the detector array 38. The detector array elements may therefore determine the intensity of the light entering the spectrograph as a function of wavelength. The information may then be multiplexed to a digitizer and prepared for transmission uphole to electronics and processing means 18.

Preferably, the off-axis paraboloidal mirror 54, the diffraction grating 56, and any mounting fixtures (not shown) used to mount them are all made of aluminum so that the thermal expansion of the components will be identical. This arrangement would ensure that the angular relations among the components would not change with temperature. As a result, the position of a given wavelength at the detector plane would be independent of temperature.

With the provided fluid analysis section 25, the spectra of the light source, of the backscattered light which has scattered off the fluid sample, and of the forward scattered and transmitted light may be determined. When the transmitted light spectrum and the backscattered light spectrum are divided by the source spectrum, two absorption spectra (one for transmitted, one for backscattered) are obtained. The absorption spectrum of the transmitted light is preferably used in the hereinafter-described analysis if its count rate is sufficient. Otherwise, the backscattered absorption spectrum (or both) may be used.

Because different materials have different absorption characteristics, it becomes possible to make a determination as to what materials comprise the fluid sample, provided, of course, that the spectra of the materials which might be in the fluid sample are known. Towards that end, the spectra of water, gas, and a plurality of different oils are found in accord with techniques well known in the art. Examples of such spectra are seen in FIG. 5a through 5c for the near infrared wavelengths.

As seen in FIG. 5a, water has absorption peaks at about 1.5 and 1.9 microns. As seen in FIG. 5b, crude oil has an in FIG. 5b has increasing absorption for wavelengths less than 1.6 microns. Many crude oils have a similar feature, but the onset is often at shorter wavelengths. Refined oils such as kerosene shown in FIG. 5c, are generally transparent between 0.7 an 1.1 microns. However, like crude oil, they typically have an absorption peak at 1.7 microns and other features which appear in crude oil at 1.2 and 1.4 microns.

Using the absorption spectra of water, gas, crude and refined oils, and drilling fluids (muds), a least squares analysis such as is described generally in Bevington, Philip R., *Data Reduction and Error Analysis for the Physical Sciences*, McGraw-Hill Book Co. (New York 1969), may be used to determine the components of the fluid sample. Or, if desired, a principle component analysis such as is described generally in Williams, P. C., et al., *J. Agricultural Food Chemistry*, vol. 33 pg 239 (1985), could be used in a similar manner to determine the components of the fluid sample. The analysis is preferably conducted in a processing means such as a computer which is located uphole in the electronics and processing circuitry 18.

With regard to the fitting technique used to determine the fluid components, not only may a single spectrum for water, gas, oils, etc. be used in the data base, but, if desired, both transmission and backscattered absorption spectra may be utilized for each. Moreover, it will be appreciated that the spectra of the various components may vary with temperature and pressure Thus, not only should the spectra of water, gas, and a plurality of oils be used as reference spectra, but a plurality of different spectra for each different material at different pressures and temperatures (and if desired for transmission and backscatter) should be available for an accurate determination of the fluid components to be made.

Those skilled in the art will appreciate that natural gas has a similar spectral shape to certain oils. On the other hand, because gas has a low density, only a small fraction of the light having a wavelength range of 0.3 to 2.5 will be absorbed by the sample. Thus, in accord with another aspect of the invention, the spectrum obtained by fiber optic bundle 34c may be compared to the spectrum obtained by fiber optic bundle 34d, to give a first indication of the percent gas contained in the sample. Having such an indication permits a more complete fitting of the different spectra even if the gas spectrum is very similar to one or more of the oil spectra.

Also, in accord with another aspect of the invention, the visible light and/or near-ultraviolet spectrum, preferably from 0.3 to 1 micron in wavelength, may be used to obtain indications of large molecules in a fluid such as porphyrins, asphaltenes, large aromatics, and resins. While these large molecules are present in low concentrations, they are easy to observe due to the absorption by their electronic transitions. Because the concentration and kind of large molecules in mud filtrates and formation fluids usually differ, a correlation of the large molecule 0.3 to 1 micron spectra provides an indication as to whether the fluid sample flowing through the optical cell 37 is changing over time. Since the first fluid to enter the cell 37 typically is the drilling fluid, the sample may be expelled rather than stored in chambers 22 or 23. Likewise, after the large molecule spectra indicate a change in fluid type (even though the NIR spectra for the oil and/or water in the fluid remain substantially the same as might be the case with an oil based mud filtrate and formation oil), the sample may be identified as a formation fluid sample, and the sample may be forwarded from the fluid analysis module 25 to the storage chambers for delivery uphole.

In conjunction with yet another aspect of the invention, the obtained spectra as well as the determination of the presence of gas may be used to control the pressure of the flow line so as to obtain a more representative sample of the formation fluid. In the situation where the formation fluid is comprised of both heavy and light hydrocarbons, bubbles of the lighter hydrocarbon can evolve out of the fluid, or the heavier hydrocarbons can condense out of the fluid. When the pressure of the fluid is below either the bubble point pressure or the dew point pressure (depending on the case) the fluid emerges from the formation in both the liquid and vapor phase. Since the less viscous vapor phase flows more freely than the liquid phase, the obtained sample includes more light hydrocarbons than is representative of the formation fluid. By changing the pressure in the flow line which is accomplished by standard techniques, the bubble point or dew point may be found as both of these effects will result in a decrease of transmitted light and an increase of backscattered light. The monitoring of transmission and reflection is best accomplished at a wavelength at which absorption is weak and at which the sample is relatively transparent. Once the bubble point or dew point pressure is found, the pressure of the flow line (sampling pressure) is increased above the relevant point by, e.g., controlling the rate at which fluid flows through the sampling apparatus and/or locating the sampling apparatus at an appropriate depth in the well.

Figure 6:
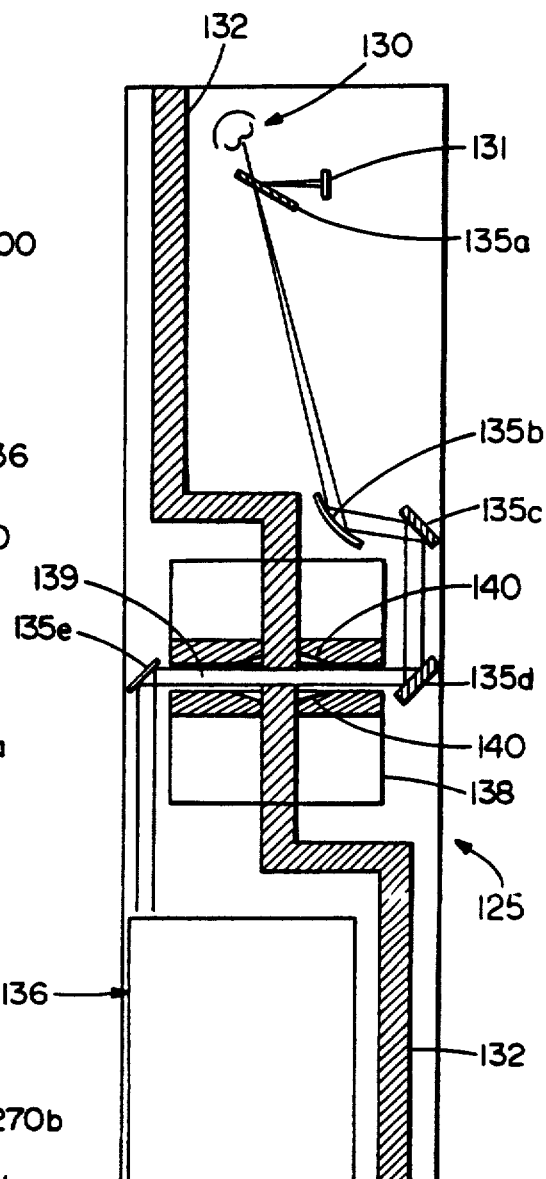
FIG. 6 is a schematic diagram of an alternative near infrared fluid analysis module of FIG. 2.

Turning to FIG. 6, an alternative embodiment 125 of the fluid analysis module 25 of the borehole apparatus 10 is seen. Basically, the fluid module components are the same as the preferred embodiment, except that instead of using optical fiber bundles, directing and focussing mirrors are used. In accord with the embodiment of FIG. 6, the source 130 is identical to that used in the preferred embodiment. The source is partially reflected by beam splitting mirror 135a to a reference detector 131 where a determination of the source spectrum downhole may be had. The non-reflected light is forwarded to collimating mirror 135b. The collimated light is then forwarded via directing mirrors 135c and 135d towards the optical cell 138 which is comprised of a high pressure stainless steel chamber with a fluid sample tube 132 passing therethrough, and with an optical path 139 perpendicular to and interrupted by the tube 132 also passing therethrough. In optical cell 138, the fluid sample tube 132 has sapphire windows 140. Light passing from mirror 135d into optical path 139, and either transmitted or scattered through the fluid sample exits the optical cell 138 and is directed by mirror 135e to the spectrometer (spectrograph) 136 which is preferably similar to the aforedescribed spectrograph 36 of FIG. 4. If desired, the spectrometer 136 may be used in lieu of the reference detector 131, provided suitable optical means (not shown) are used to transport light directly from the source to the spectrometer and other means (multiplexing) are used to select either the light from the source or the light from the optical cell. Additionally, backscattered light may be analyzed by the spectrometer if mirror 135c is replaced by a suitable beam splitter and additional suitable optical means (not shown) are used to transport the backscattered light to the spectrometer. With such additional optical means, it will be appreciated that the embodiment of FIG. 6 becomes the functional equivalent of the embodiment of FIG. 4, with fiber optics being replaced by reflective optics.

Figure 7:
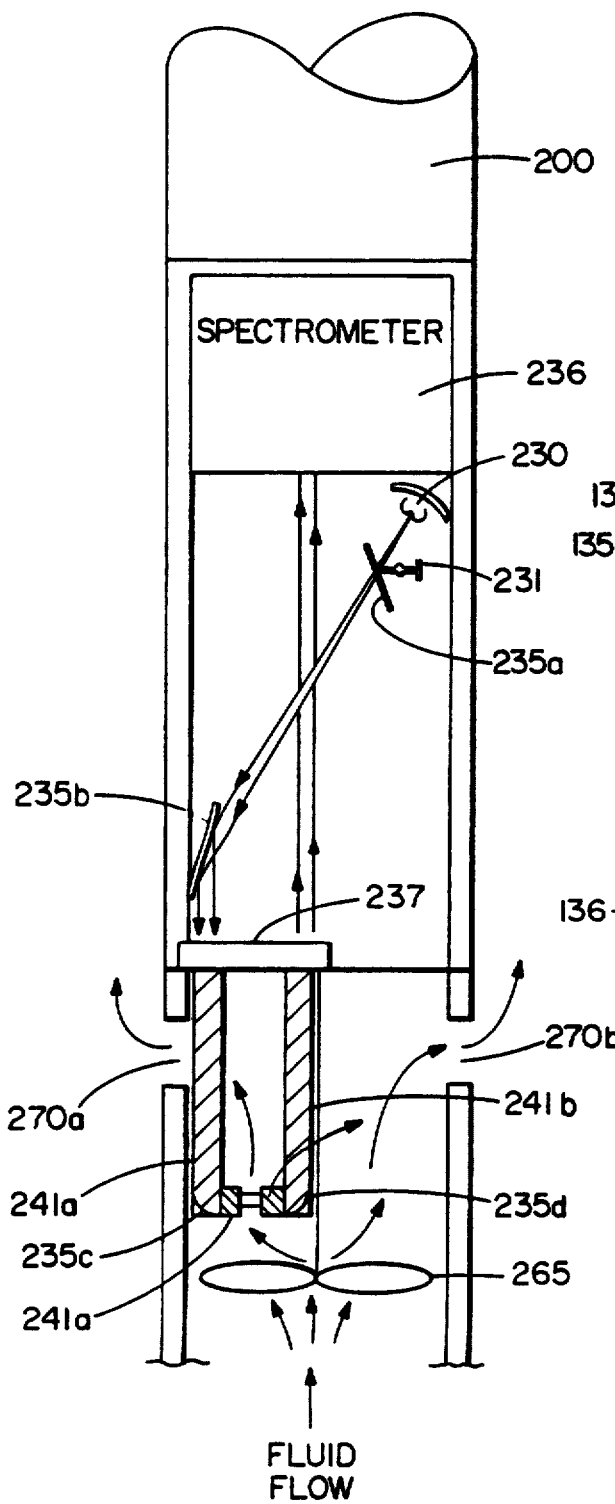
FIG. 7 is a schematic diagram of the fluid analysis module of the invention which is used in conjunction with a production logging tool.

Turning to FIG. 7, a fluid analysis module 225 of a production logging tool is seen. The theoretical basis for the fluid analysis module 225 is identical to the fluid analysis modules of FIGS. 3 and 6. However, instead of providing a fluid admitting assembly for obtaining fluid samples from the formation and chambers for storage of the obtained samples, fluid is already flowing through the tool 200. As in the previously discussed modules, the fluid analysis module 225 uses a quartz halogen lamp as a light source 230. As in the embodiment of FIG. 6, a beam splitter mirror 235a is used to permit a reference detector 231 to sense and determine the spectrum of the source, and to send on the beam towards the fluid to be sampled. The beam is directed by collimating mirror 235b through a sapphire window 237 and then through a sapphire rod 241a having reflective surface or mirror 235c contained therein. The beam is then directed through a fluid sample which is obtained by mixing fluid by spinner 265, and having some of the fluid passing through an opening of approximately five millimeters between the sapphire rods 241a and 241b (the opening comprising a "testing region". The fluid then exits the fluid analysis module 225 through ports 270a and 270b in the wall of tool 200. The light which is transmitted or scattered through the fluid is then transmitted through sapphire rod 241b which includes a reflective surface or mirror 235d, out through sapphire window 237 and directly to spectrometer 236. Again, spectrometer 236 is preferably a spectrograph as shown in FIG. 3, and the spectrometer may be used as the reference detector Also, as was described with reference to FIG. 6, the backscattered light may also be directed to the spectrometer by a suitable arrangement of reflective optics.

In operation, the borehole logging tool 10 shown in FIGS. 2 and 3 is placed downhole via extended cable 15. At a desired location, electronic section 18 provides signals to electronic section 16 which causes anchoring member 21 and admitting assembly 20 to extend into contact with the borehole walls. Upon a second signal from electronic section 16, and in accord with known tools in the art, formation fluid is obtained by the admitting assembly 20 and forwarded into the sample tube 32 of the fluid analysis module 25. Concurrently, light emitted by an optical source 30 is carried via optical fibers 34 to optical cell 37 were it is transmitted through, scattered by, and absorbed by the fluid sample. Forward scattered light, and light transmitted through the sample are forwarded to the spectrograph 36 where the transmitted, forward scattered spectrum is separated into its component wavelengths. Also, preferably, backscattered light and a spectral sample of the optical source are forwarded to the spectrograph 36 via a fiber optical bundle for division into its wavelength components. Each spectrum is sampled in order (the source spectrum not necessarily being sampled as often. Then, usinq detector array 38 and electronic section 16, the different spectral information is forwarded uphole to electronic and processing section 18 for analysis. Also, if desired, fluid temperature and pressure information may also be forwarded uphole. Preferably, using a least squares fit, the processor in processing section 18 fits the obtained spectra (with wavelengths from 0.3 to 2.5 microns) to a plurality of temperature- and pressurespecific absorption spectra for oils, water, and gas which are stored in a data base accessible to the processor. As a result of the fitting process, a determination is made of the components which comprise the fluid sample. A log of such a determination over borehole depth can then be made.

As indicated above, if both backscatter and forward scatter and transmission information is obtained, a first indication of the presence of gas may be had. This first indication may then be used to help in the fitting process. Also, if desired, using the spectrum from approximately 0.3 microns to 1 micron, a determination of whether a change has occurred in the types and/or quantities of large molecules may be had by using a correlation technique The determination of whether a fluid change has occurred may then be used by the processor 18 via electronic section 16, to cause the fluid sample to be expelled into the borehole or to be forwarded into holding chambers 22 or 23 for further uphole analysis.

There has been described and illustrated herein an apparatus and method for analyzing the composition of a fluid comprised of one or more of water, oil, and gas. While particular embodiments of the invention have been described and illustrated, it is not intended that the invention be limited thereby, as it is intended that the invention be broad in scope and that the specifications be read likewise. Thus, while particular arrangements with light sources and mirrors and fiber optics were shown, it will be appreciated that other light sources as well as other means for guiding the light to and from the sample may be utilized. Likewise, other means for measuring the absorption spectra such as specialized filters, interference spectrometers, or refractive optic systems could be utilized. Further, while the invention was described as having data processing means on the surface of the formation, it will be appreciated that such processing means could be at least partially located downhole. Therefore, it will be apparent to those skilled in the art that other changes and modifications may be made to the invention as described in the specification without departing from the spirit and scope of the invention as so claimed.

We claim:

1. An apparatus for analyzing the composition of a fluid comprising at least one of water, oil, and gas, the apparatus comprising:
   (a) a light source means for emitting at least near infrared rays towards said fluid, said light source having a spectrum;
   (b) spectral detector means for detecting the spectrum of at least near infrared rays which were at least one of scattered by and transmitted through said fluid;
   (c) data base means for storing near infrared absorption spectral information of at least two of said water, oil and gas expected to be analyzed; and
   (d) processing means for obtaining said spectrum of said light source means and said spectrum detected by said spectral detector means and for substantially determining therefrom and from at least said near infrared absorption spectral information of said data base means the composition of said fluid.

2. An apparatus according to claim 1, wherein: said light source means emits rays primarily having a range of wavelengths from 1 to less than 2.5 microns.

3. An apparatus according to claim 1, wherein: said light source emits rays primarily having a range of wavelengths from 0.3 to less than 2.5 microns.

4. An apparatus according to claim 1, further comprising:
   (e) collimation means for directing at least said near infrared rays towards said fluid.

5. An apparatus according to claim 4, wherein: said collimation means comprises fiber optics means.

6. An apparatus according to claim 1, wherein: said spectral detector means further detects light from said light source means and provides said processing means with the spectrum of said light source means.

7. An apparatus according to claim 1, wherein: said data base further includes near infrared spectral information for at least one of said different oils, gas, and water, at at least two pressures.

8. An apparatus according to claim 1, wherein: said data base further includes near infrared spectral information for at least one of said different oils, gas, and water, at at least two temperatures.

9. An apparatus according to claim 1, wherein: said processing means comprises means for conducting a least squares fitting process, wherein given said spectrum of said light source means, said detected spectrum, and said data base, said means for conducting a )east square fitting process substantially determines the composition of said fluid.

10. An apparatus according to claim 1, wherein: said processing means comprises means for conducting a principle component analysis process, wherein given said spectrum of said light source means, said detected spectrum, and said data base, said means for conducting a principle component analysis process substantially determines the composition of said fluid.

11. An apparatus according to claim 1, wherein: said processing means further comprises
   means for dividing at least one of the spectra of said transmitted and scattered detected rays by said spectrum of said light source means to obtain an absorption spectrum of said fluid, and
   means for fitting said stored absorption spectral information to said absorption spectrum of said fluid.

12. An apparatus according to claim 1, wherein: said apparatus is for analyzing the composition of a fluid comprising at least two of water, oil, and gas.

13. An apparatus according to claim 1, wherein: said apparatus is for analyzing the composition of a fluid comprising water and at least one of oil and gas.

14. An apparatus according to claim 1, further comprising:
   (e) chamber means for containing and permitting said fluid to flow therethrough, wherein said chamber means has at least a window comprised of a material which is substantially transparent to said near infrared rays, and wherein said near infrared rays are at least one of scattered_by and transmitted through said fluid in said chamber means before detecting by said spectral detector.

15. A borehole apparatus for analyzing the composition of a fluid obtained from a formation, said fluid comprised of at least one of water, oil, and gas, the apparatus comprising:
   (a) a testing region;

(b) means for directing a sample of said fluid obtained from said formation into said testing region;

(c) a light source means for emitting light rays towards said fluid obtained from said formation in said testing region, said light source having a determinable spectrum;

(d) spectral detector means for detecting the spectrum of resulting rays which were emitted by said light source and which were at least one of scattered by and transmitted through said fluid, wherein said testing region, said means for directing, said light source means, and said spectral detector means, together at least partially comprise a borehole tool operating downhole in said formation such that said spectrum of resulting rays are detected downhole in said formation;

(e) data base means for storing spectral information of at least two of said water, oil and gas expected to be analyzed; and (f) processing means for obtaining said light source means spectrum and said detected spectrum and for substantially determining therefrom and from said spectral information of said data base means the composition of said fluid.

16. A borehole apparatus according to claim 15, wherein:
said light source means emits at least near infrared rays, and said testing region is a testing chamber having at least windows comprising of a material which is substantially transparent to said emitted rays.

17. A borehole apparatus according to claim 16, where said light source means emits at least near infrared rays said borehole tool, further comprising:
(g) collimation means for directing at least said near infrared rays towards said fluid in said testing region.

18. A borehole apparatus according to claim 17, wherein:
said collimation means comprises a first fiber optic bundle for directing said at least near infrared rays from said light source to one of said substantially transparent windows of said testing chamber, and a second fiber optic bundle for directing light transmitted through said fluid obtained from said formation to said spectral detector means.

19. A borehole apparatus according to claim 18, wherein:
said collimation means further comprises a third fiber optic bundle for directing at least some of light emitted by said light source directly to said spectral detector means, and a fourth fiber optic bundle for directing light substantially backscattered by said fluid obtained from said formation in said testing chamber to said spectral detector means.

20. A borehole apparatus according to claim 19, wherein:
from the spectra determined by said spectral detector means of said substantially backscattered light and said transmitted light, said processing means provides an indication of the presence of gas in said fluid obtained from said formation.

21. A borehole apparatus according to claim 19, wherein:
said testing chamber, said windows, and said first and fourth fiber optic bundles are arranged such that a surface defined by an interface of said first and fourth fiber optic bundles and a first of said windows is angled relative to an axis of flow of said fluid in said testing chamber such that said substantially all of said light rays which are specularly reflected at said surface are not directed through said fourth fiber optic bundle to said spectral detector means.

22. A borehole apparatus according to claim 17, said borehole tool further comprising:
(h) at least one fluid collecting chamber, wherein
said light source emits light having a range of wavelengths from 0.3 to 2.5 microns, and
said processing means includes means for correlating spectral information from a plurality of samples of fluid obtained from said formation, and for determining from differences in spectral information of said samples substantially in the 0.3 to 1 micron wavelength range when said fluid obtained from said formation changes from mud filtrate to formation fluid.

23. A borehole apparatus according to claim 17, wherein:
said data base further includes spectral information for at least one of said different oils, gas, and water, at at least two pressures.

24. An apparatus according to claim 17, wherein:
said data base further includes spectral information for at least one of said different oils, gas, and water, at at least two temperatures.

25. A method for analyzing in a borehole apparatus the composition of a fluid obtained from a formation, comprising:
(a) directing light rays from a light source means towards said fluid, said light source means having a spectrum comprising at least of near infrared wavelengths;
(b) detecting a spectrum of light which was at least one of backscattered by and transmitted through said fluid, said detected spectrum of light being comprised of at least said near infrared wavelengths, wherein said steps of directing and detecting are conducted by said borehole apparatus downhole in said formation;
(c) obtaining said spectrum of said light source; and
(d) substantially determining the composition of said fluid from said obtained and detected spectra, and from a plurality of predetermined near infrared spectra of at least two of water, a plurality of oils, and gas.

26. A method according to claim 24, where said apparatus includes collimating means, wherein:
said obtaining of said spectrum of said light source step comprises directing some light from said light source means directly to a spectral detector, and detecting the spectrum of said directly directed light, wherein said light which is directed toward said fluid is collimated by said collimating means.

27. A method according to claim 26, wherein:
said composition of said fluid is substantially determined by conducting a least squares fitting process, wherein given said spectrum of said light source means, said detected spectrum, and said plurality of predetermined spectra, a least square fitting process substantially determines the composition of said fluid.

28. A method according to claim 25, wherein said detected spectrum of light comprises both said backscattered and said transmitted spectra, further comprising:

(e) determining the presence of gas in said fluid from said detected backscattered and transmitted spectra.

29. A method according to claim 28, wherein:
said composition or said fluid is substantially determined by conducting a least squares fitting process, wherein given said spectrum of said light source means, said detected spectrum, said determination of the presence of gas, and said plurality of predetermined spectra, a least square fitting process substantially determines the composition of said fluid.

30. A method according to claim 28, further comprising:
(f) controlling the pressure drop in a flow line of said apparatus for said fluid and determining one of a bubble point and a dew point pressure; and
(g) obtaining said fluid with said borehole apparatus wherein said fluid is obtained at a pressure above said determined one of a bubble point and a dew point pressure.

31. A method according to claim 25, wherein said light source means emits a range of wavelengths from at least 0.3 to 2.5 microns, further comprising:
(e) correlating spectral information in at least a wavelength range of 0.3 to 1 micron from a plurality of samples of fluid obtained from said formation; and
(f) determining from said correlations when said fluid obtained from said formation changes from mud filtrate to formation fluid.

32. A method according to claim 25, wherein:
said plurality of predetermined spectra include spectra of at least one of said plurality oils, gas, and water, at at least two different pressures.

33. A method according to claim 25, wherein:
said plurality of predetermined spectra include spectra of at least one of said plurality oils, gas, and water, at at least two different temperatures.

34. A method according to claim 25, wherein:
said plurality of predetermined spectra include a backscattered spectrum and a transmitted spectrum of at least one of said plurality oils, gas, and water.

* * * * *

UNITED STATES PATENT AND TRADEMARK OFFICE
CERTIFICATE OF CORRECTION

PATENT NO. : 4,994,671

DATED : February 19, 1991

INVENTOR(S) : Safinya et al.

It is certified that error appears in the above-identified patent and that said Letters Patent is hereby corrected as shown below:

Column 4, lines 23 and 24, change "4,396,259 to Miller and Serial No. 313,236" to -- 3,813,936 to Urbanosky et al. and U.S. Patent No. 3,811,321 to Urbanosky --; and Column 4, line 24 delete ", no abandoned".

Signed and Sealed this

Ninth Day of March, 1993

Attest:

STEPHEN G. KUNIN

Attesting Officer

Acting Commissioner of Patents and Trademarks